United States Patent
Iscan et al.

(10) Patent No.: US 11,057,148 B2
(45) Date of Patent: Jul. 6, 2021

(54) DATA ENCODING AND DECODING

(71) Applicant: Huawei Technologies Duesseldorf GmbH, Duesseldorf (DE)

(72) Inventors: Onurcan Iscan, Munich (DE); Wen Xu, Munich (DE); Ronald Boehnke, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/395,447

(22) Filed: Apr. 26, 2019

(65) Prior Publication Data
US 2019/0253182 A1 Aug. 15, 2019

Related U.S. Application Data

(63) Continuation of application No. PCT/EP2016/075855, filed on Oct. 26, 2016.

(51) Int. Cl.
*H04L 1/00* (2006.01)

(52) U.S. Cl.
CPC .......... *H04L 1/0013* (2013.01); *H04L 1/0003* (2013.01); *H04L 1/0014* (2013.01); *H04L 1/0041* (2013.01); *H04L 1/0046* (2013.01); *H04L 1/0072* (2013.01); *H04L 1/0075* (2013.01); *H04L 1/0039* (2013.01)

(58) Field of Classification Search
CPC ... H04L 1/0013; H04L 1/0075; H04L 1/0041; H04L 1/0003; H04L 1/0014; H04L 1/0046; H04L 1/0072; H04L 1/0039
USPC ........................................................ 714/790
See application file for complete search history.

(56) References Cited

U.S. PATENT DOCUMENTS

| | | | |
|---|---|---|---|
| 7,437,654 B2 * | 10/2008 | Das | ........................ H04L 1/0002 370/342 |
| 2002/0048331 A1 * | 4/2002 | Tran | ........................ H04L 1/005 375/341 |

(Continued)

FOREIGN PATENT DOCUMENTS

| | | |
|---|---|---|
| EP | 1207659 A2 | 5/2002 |
| EP | 1931072 A2 | 6/2008 |
| GB | 2533412 A | 6/2016 |

(Continued)

OTHER PUBLICATIONS

Eriksson et al.,"Complexity Reduction of Blind Decoding Schemes Using CRC Splitting," Global Communications Conference (GLOBECOM), XP032375254, 2012 IEEE, pp. 3731-3736, Institute of Electrical and Electronics Engineers—New York, New York (Dec. 3, 2012).

(Continued)

*Primary Examiner* — James C Kerveros
(74) *Attorney, Agent, or Firm* — Leydig, Voit & Mayer, Ltd.

(57) ABSTRACT

A signal transmitter and a signal receiver for interpreting a received message are provided. The receiver is configured to perform the steps of: decoding a first part of the message using a channel decoding scheme with a predefined set of decoding parameters to form a first data block; and subsequently decoding a second part of the message using the channel decoding scheme with decoding parameters that are at least partially dependent on the content of the first data block.

20 Claims, 6 Drawing Sheets

(56) References Cited

U.S. PATENT DOCUMENTS

| | | | |
|---|---|---|---|
| 2007/0157069 A1* | 7/2007 | Lyakh | H04L 1/1845 |
| | | | 714/791 |
| 2009/0319855 A1* | 12/2009 | Yue | H04L 1/0003 |
| | | | 714/751 |

FOREIGN PATENT DOCUMENTS

| | | | |
|---|---|---|---|
| WO | 2017121473 A1 | 7/2017 | |
| WO | 2017144111 A1 | 8/2017 | |

OTHER PUBLICATIONS

Arikan, "Channel Polarization: A Method for Constructing Capacity-Achieving Codes for Symmetric Binary-Input Memoryless Channels," IEEE Transactions on Information Theory, vol. 55, No. 7, pp. 1-23, Institute of Electrical and Electronics Engineers—New York, New York (Jul. 2009).

Dizdar et al, "A High-Throughput Energy-Efficient Implementation of Successive Cancellation Decoder for Polar Codes Using Combinational Logic," XP011605513, IEEE Transactions on Circuits and Systems I: Regular Papers, IEEE, vol. 63, No. 3, pp. 436-447, Institute of Electrical and Electronics Engineers—New York, New York (Mar. 1, 2016).

Sun et al, "Application—Specitic Accelerators for Communications," Handbook of Signal Processing Systems; pp. 345-358, Retrieved from the Internet: URL:https://ebookcentral.proquest.com/lib/epo-ebooks/home.action (Jan. 1, 2010).

Mitchell et al, "On the Block Error Rate Performance of Spatially Coupled LDPC Codes for Streaming Applications," 2016 IEEE Information Theory Workshop (ITW), IEEE, pp. 236-240, Institute of Electrical and Electronics Engineers—New York, New York (Sep. 11, 2016).

Polyanskiy et al., "Channel Coding Rate in the Finite Blocklength Regime," IEEE Transactions on Information Theory, vol. 56, No. 5, pp. 2307-2359, Institute of Electrical and Electronincs Engineers, New York, New York (May 2010).

* cited by examiner

DATA ENCODING AND DECODING

CROSS-REFERENCE TO RELATED APPLICATIONS

This application is a continuation of International Application No. PCT/EP2016/075855, filed on Oct. 26, 2016, the disclosure of which is hereby incorporated by reference in its entirety.

TECHNICAL FIELD

Embodiments of this disclosure relate to encoding and decoding data.

BACKGROUND

In a typical modern communication system, the manner in which a transmitter forms its signals can be varied to account for operational factors such as the expected characteristics of the channel it is using, the reliability with which transmitted data is required to be decoded and the required data rate. Some examples of the factors that can be varied include the encoding scheme, the amount of error correction encoding and the message length. In order for a receiver to interpret the signal correctly it needs to be aware of the parameters used at the transmitter. If the transmitter is able to vary its parameters then the transmitter and the receiver need to align their parameters in order to exchange messages. In some systems, the parameters are exchanged over a separate channel. That channel is often called the control channel. The data defining the parameters is often called the control information, control message or control data. The control data may, for example, be a few bytes long.

Normally, the data defining the exchanged parameters is smaller in size than the user message that is to be transmitted. The user message is often called the payload. The data of the user message is transmitted over a data (or payload) channel. When the control data is sent on a control channel separate from the data channel, the control and user data are generally encoded and decoded separately.

It is known that the performance of channel codes generally decreases with decreasing message length. For illustration, consider an AWGN channel with BPSK modulation and a certain target block error rate (BLER). FIG. 1 shows an estimate of the required SNR to achieve a BLER of 0.01 for different message lengths if the code rate is 1/2. It can be seen that with decreasing message length, the required SNR increases. In other words, the cost of transmitting a bit is reduced by using longer channel codes. It follows that, since a control message typically has a small size, the cost per bit (e.g. in terms of SNR to achieve a target BLER) of conveying control data is typically higher than that of the payload data if they are encoded and decoded separately.

As indicated above, a known encoding mechanism is to assign separate channels for transmitting the control message and the payload data. The control message and the payload data are encoded and decoded separately. For example, in the LTE protocol, Turbo codes are used to encode the payload. Multiple modulation and coding schemes (MCSs) can be used. The current choice of MCS is signaled over the control channel with a separate channel code, namely the convolutional code (CC). After decoding the control message, the receiver can start decoding the payload. Without decoding the control message the receiver would not know which coding and modulation scheme was used for the payload transmission.

The disadvantages of this solution are twofold. First, the receiver needs to run two decoding processes: one for the control channel and one for the actual payload. Second, because the control message typically contains a small amount of information and because FEC schemes perform poorly with short block lengths, the available resources are used in an inefficient way.

SUMMARY

One way to improve performance is to concatenate the payload data and the control data and encode them together. However, in this approach it generally is only possible to transmit a control message that relates to payload data other than the payload data with which it is concatenated. For instance, the control message might relate to some future payload data. Otherwise, the content of the control data would be needed to decode the control data itself.

It would be advantageous to be able to send control data more efficiently.

According to one aspect, there is provided a signal receiver for interpreting a received message, the receiver being configured to perform the steps of: decoding a first part of the message using a channel decoding scheme with a predefined set of decoding parameters to form a first data block; and subsequently decoding a second part of the message using the channel decoding scheme with decoding parameters that are at least partially dependent on the content of the first data block.

One or more decoding parameters that is/are dependent on the content of the first data block may be any one or more of the following: an indicator of the length of the second part of the message, a rate adaptation scheme for the second part of the message, a puncturing scheme for the second part of the message, a modulation order for the second part of the message, an error detection scheme for the first and/or the second part of the message and a set of frozen bits for the second part of the message.

The channel decoding scheme may be such that the first part of the message can be decoded independently of the second part of the message. Then at least some state data for the decoding process can be discarded between decoding the first and second parts, and decoding can readily be suspended between decoding the first and second parts if required. The signal receiver may be configured to perform the step of decoding the first part of the message using trellis decoding and/or sliding window decoding. These approaches are amendable to performing decoding when not all the encoding parameters are known.

The receiver may store the predefined set of decoding parameters. Then they can be available for decoding when required.

The predefined set of decoding parameters may include one or more of: a length of the first part of the message, a rate adaptation scheme for the first part of the message, a puncturing scheme for the first part of the message, a modulation order for the first part of the message, an error detection scheme for the first part of the message and a set of frozen bits for the first part of the message. These may be useful in decoding the first part of the message.

The channel decoding scheme may be one of: convolutional decoding, low-density parity check decoding, Wi-Turbo decoding, successive cancellation polar decoding, and successive cancellation list polar decoding. These are amendable to decoding when a limited amount of control information is known.

The first part of the message may precede the second part of the message. This makes it efficient to decode the first part before the second part.

The first part of the message may be a leading part of the message. This can allow the remainder of the message to be encoded as for the second part.

According to another aspect, there is provided a signal encoder for encoding a data signal to form a message, the signal encoder storing a set of predetermined encoding parameters and being configured to form the message as: a first part that is encoded according to the predetermined encoding parameters, the first part comprising data defining further encoding parameters; and a second part that is encoded according to the further encoding parameters; the encoder being configured to encode the message by an encoding scheme that permits the first part of the message to be decoded independently of the second part of the message.

The encoder may be configured to encode the message by an encoding scheme such that knowledge of the further encoding parameters is required to permit the second part of the message to be decoded. The receiver can then decode the second part once control information has been extracted from the first part.

The signal encoder may be configured to select the further encoding parameters. The signal encoder may be configured to select at least one of the further encoding parameters at the time of encoding the message. Then it can adapt them to suit the current circumstances.

The further encoding parameters may include one or more of a length of the second part of the message, a rate adaptation scheme for the second part of the message, a puncturing scheme for the second part of the message, a modulation order for the second part of the message, an error detection scheme for the second part of the message and a set of frozen bits for the second part of the message. Then these parameters can be adapted to suit the current circumstances.

The signal encoder may be configured to cause the first part of the message to be transmitted before the second part of the message. This makes it efficient to decode the first part before the second part.

According to a third aspect, there is provided a communication system comprising a signal encoder as set out above and a signal receiver as set out above, the signal receiver being arranged to interpret a message formed by the signal encoder.

According to a fourth aspect, there is provided a method for interpreting a received message, the method comprising: decoding a first part of the message using a channel decoding scheme with a predefined set of decoding parameters to form a first data block; and subsequently decoding a second part of the message using the channel decoding scheme with decoding parameters that are at least partially dependent on the content of the first data block.

According to a fifth aspect, there is provided a method for encoding a data signal to form a message, the method comprising: storing a set of predetermined encoding parameters; and forming the message as: a first part encoded according to the predetermined encoding parameters, the first part comprising data defining further encoding parameters; and a second part encoded according to the further encoding parameters; the method comprising encoding the message by an encoding scheme that permits the first part of the message to be decoded independently of the second part of the message.

BRIEF DESCRIPTION OF DRAWINGS

Embodiments of the present invention will now be described by way of example with reference to the accompanying drawings. In the drawings.

DESCRIPTION OF EMBODIMENTS

Figure 1:
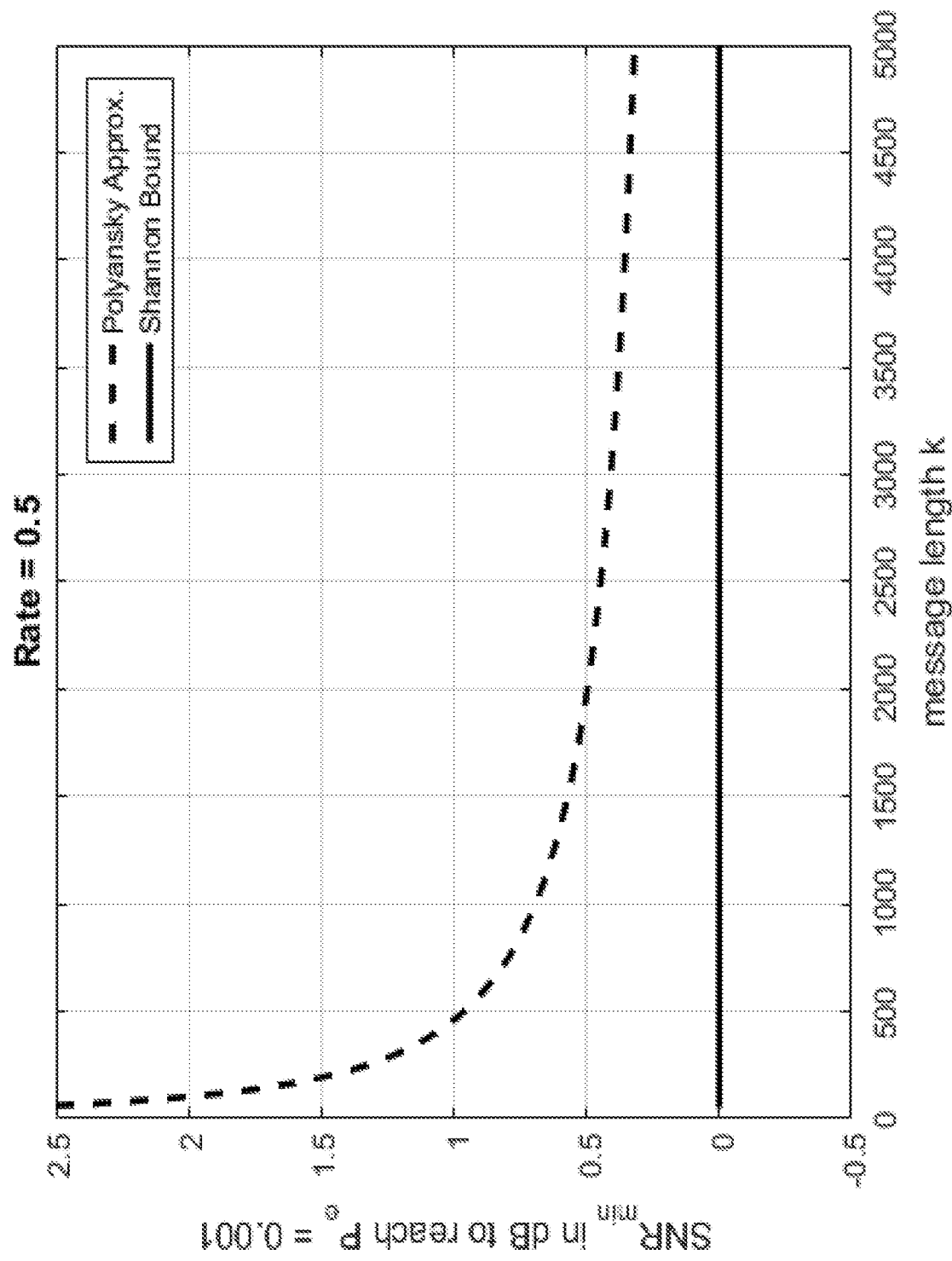
FIG. 1 shows the required SNR to achieve a target BLER for different message lengths according to the Gaussian approximation on the finite length bound given in Polyanskiy, Poor, and Verdú. "Channel coding rate in the finite blocklength regime" IEEE Transactions on Information Theory, Vol. 56, No. 5, May 2010.
Figure 2:
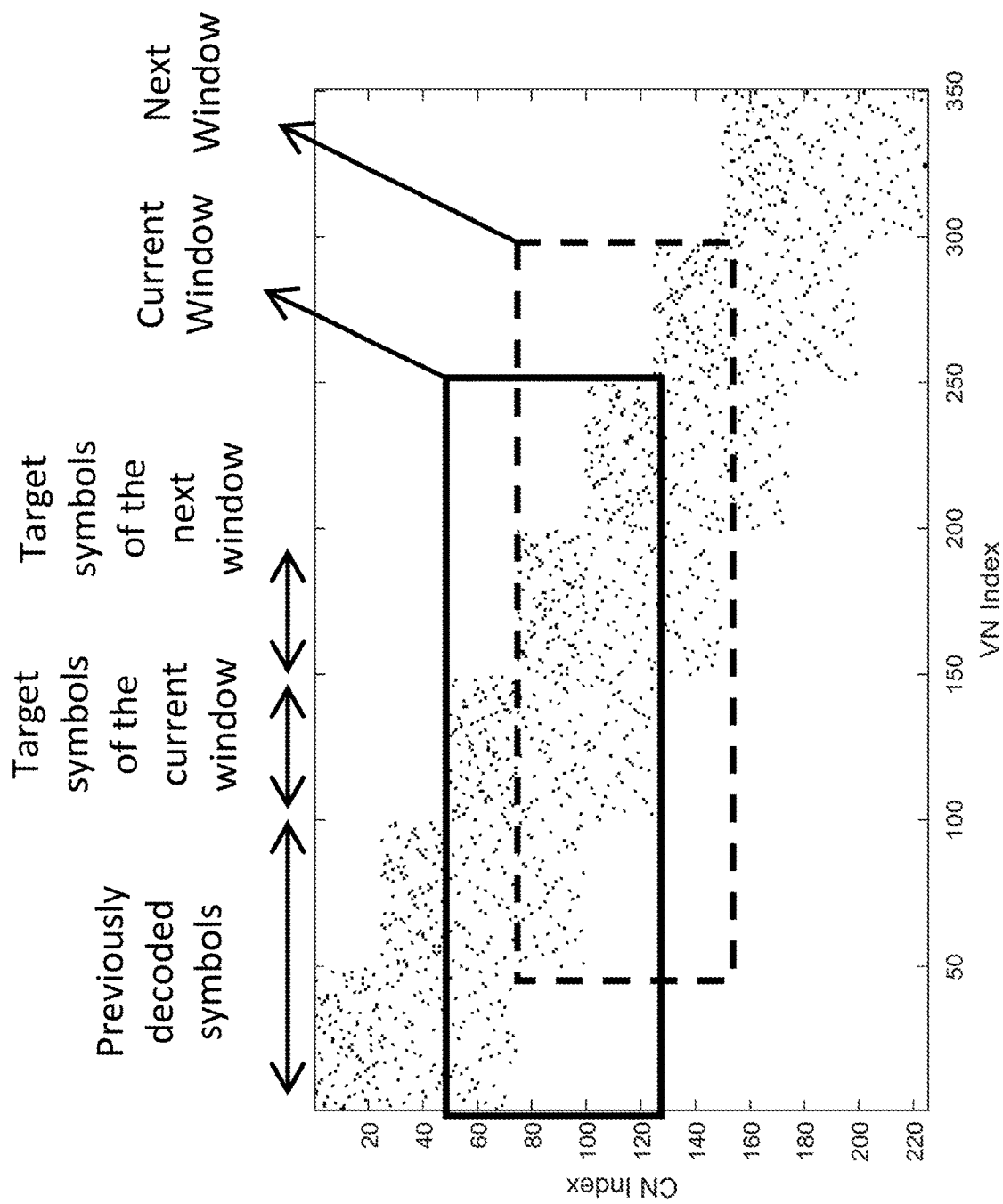
FIG. 2 illustrates the Parity Check Matrix of a convolutional LDPC Code.
Figure 3:
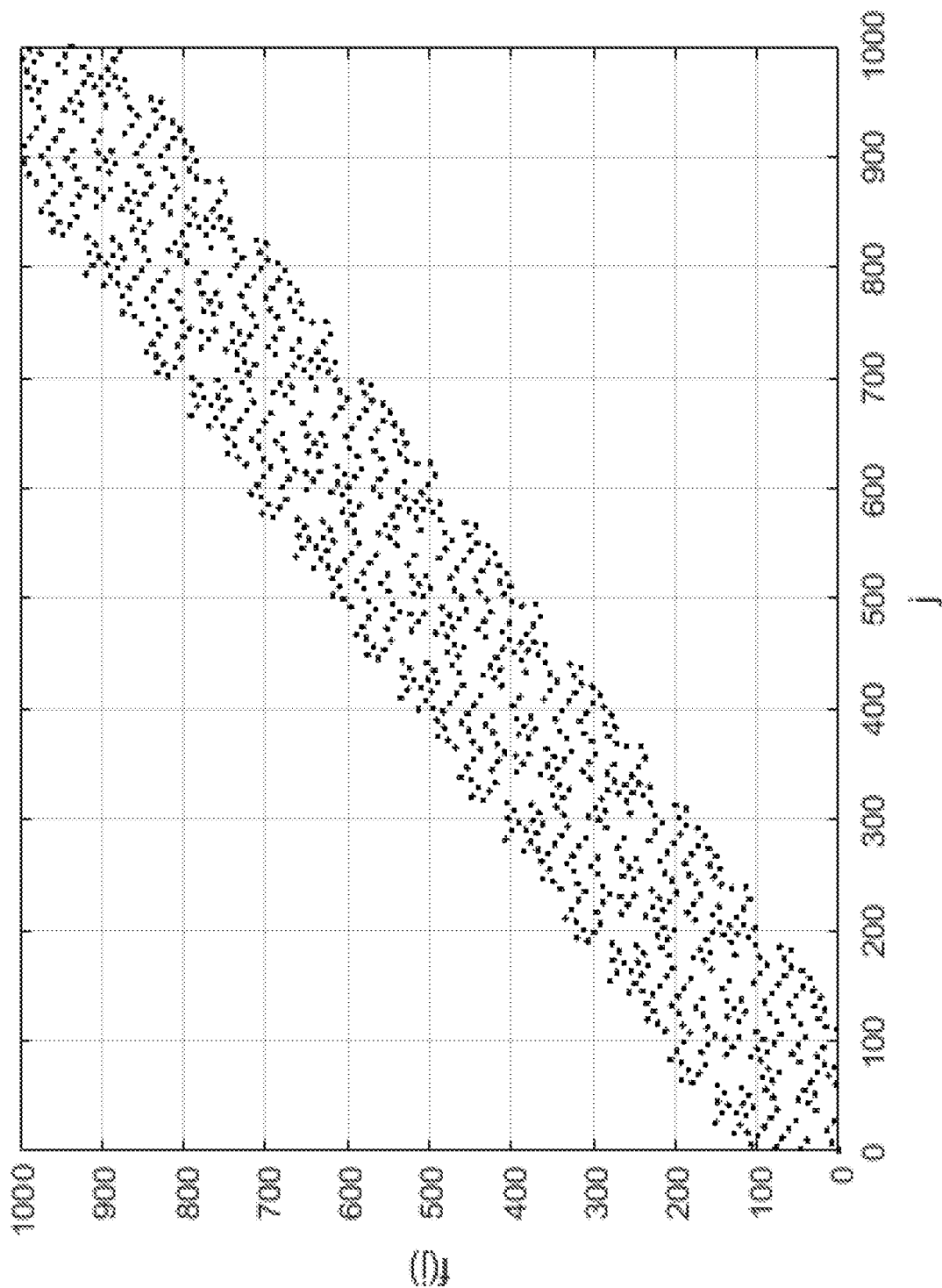
FIG. 3 shows the interleaving function f(j) of a Wi-Turbo Code.

The encoding mechanisms to be described below involve transmitting a payload and the control data needed to decode it (or at least to decode it efficiently) together in a single message. The raw or literal content of the message represents a codeword which, when correctly decoded, will yield the original payload and control data. The encoding of the message is such that the control data can be decoded efficiently even when the receiver is not in possession of enough information to decode the payload efficiently or at all. Once the control data has been decoded it can be used to decode the payload.

The control data and the payload may be encoded at substantially the same time as each other, or one may be encoded a substantially time after the other.

Conveniently, the control data and the payload data are encoded according to the same high-level encoding scheme. The control data may be encoded using default, fixed, or predetermined parameters for that coding scheme. Those parameters may be stored by the encoder and the decoder. The encoder may adaptively select the parameters to be used to encode the payload data, for instance so as to improve throughput and/or decoding accuracy. Those parameters can be conveyed in the control data. The high-level encoding scheme itself may be selected to facilitate a receiver decoding part of the message (i.e. the control data) without decoding the whole message.

The mechanisms may involve encoding and subsequently decoding payload data and control data by using certain classes of channel codes that allow retrieving part of the information from a received codeword without decoding the whole codeword. Control data partly or wholly defining the channel coding scheme for the payload is encoded within the same codeword as the payload. Any parameters usable to decode the payload that are not contained in the codeword may be predetermined and stored by the receiver and/or determined by the receiver through trial and error. One example of a decoding scheme that is compatible with this approach is using sliding window decoding.

Embodiments of this approach can provide several advantages. First, since the message/codeword in which the control data is contained also contains the payload, it is longer than a message containing only the control data. As a result, the control data is transmitted with less cost in terms of energy per bit as compared to transmitting them over a separate control channel. Second, this method allows encoding a control message carrying channel coding parameters for decoding part of a codeword inside that very same codeword. That means the parameters can be conveyed in a prompt manner, allowing quick adaptation of coding parameters. Third, if an error detecting code (such as a CRC) is used over the control message, this allows transmission errors to be detected and responded to promptly. If the control data is not decoded correctly, the receiver can send a non-acknowledgement (NACK) message, e.g. as a retransmission request, without having decoding the rest of the codeword. Fourth, if an error detecting code is used over the control data the decoding of the rest of the codeword can be improved if the control data is decoded correctly. For example, by setting L-values for soft decoding to +/−infinity according to the decoded control message.

In order that the same high-level encoding scheme can be applied to both parts of the message, it is preferred that the encoding scheme is one that permits reliable decoding of the control data using predetermined parameters. Otherwise, the receiver might have to try multiple options for the parameters to be used to decode the control data until it finds the right one. Some examples of preferred encoding schemes will be described. It will be appreciated that for each encoding scheme there is a corresponding decoding scheme for recovering the message data.

Convolutional Codes

When data has been encoded using a convolutional code it is possible to decode the k-th bit of the convolutionally encoded data if code bits corresponding to k+t trellis segments are received, where t is the trace-back length. The reason for this is that later data influences the decoding of the earlier data only slightly. Typically, t is a few integer multiples of the constraint length of the convolutional code, for example 10 to 15. The first $k_c$ bits of a message block can be assigned to carry the control message. Once $k_c$+t trellis segments of the message have been received, the control data can be recovered even if the whole message has not yet been received. The control data can be encoded with, e.g. a fixed puncturing pattern known to the receiver.

When convolutional encoding is used, examples of the parameters for decoding the payload data that can be carried in the control data are any one or more of:
a. message length,
b. puncturing scheme for the rest of the payload,
c. modulation order for the rest of the payload.

Each of these may be predetermined for the portion of the message carrying the control data. Data defining each predetermined parameter can be stored by the receiver for use as default encoding parameter(s) for decoding the control data.

LDPC Convolutional Codes

These are also known as Spatially Coupled LDPC codes (SC-LDPC).

SC-LDPC codes are built by coupling smaller LDPC codes. They have a parity check matrix with a diagonal structure. (See the applicant's co-pending patent application entitled "Communication System with Latency-Controlled Forward Error Correction" (International Application No. PCT/EP2016/054059, published as WO 2017/144111 A1)). The structure of the parity check matrix allows a sliding window decoder to be used. By suitable choice of the decoder's window length, part of the codeword can be decoded without processing the rest of the codeword.

When LDPC convolutional encoding is used, examples of the parameters for decoding the payload data that can be carried in the control data are any one or more of:

a. message length,
b. coupling length,
c. length of the codeword,
d. rate adaptation parameters (e.g. puncturing and/or expanding patterns) for the payload part of the codeword,
e. error detection bits (e.g. for a CRC mechanism).

Each of these (with the exception of the error detection bits) may be predetermined for the portion of the message carrying the control data. Data defining each predetermined parameter can be stored by the receiver for use as default encoding parameter(s) for decoding the control data.

Where error detection bits (e.g. for a CRC mechanism) are provided, these may be used to support a decision to reject the message, e.g. by the receiver transmitting a NACK in respect of the message, the receiver transmitting a retransmission request in respect of the message. The receiver may terminate its decoding of the message if the error detection bits recovered for the control data do not match a CRC computed by the receiver over some or all of the recovered control data.

Wi-Turbo Codes

Wi-turbo codes are turbo codes with an interleaver (a window interleaver) that allows using a window decoder (See the applicant's co-pending patent application entitled "Window-Interleaved Turbo (Wi-Turbo) Codes" (International Application No. PCT/EP2016/050570, published as WO 2017/121473 A1)). FIG. 1 shows the interleaving function f(j) of a Wi-turbo code. Similarly to convolutional LDPC codes, under this scheme a control message contained in a codeword can be decoded without processing the whole codeword.

When Wi-turbo encoding is used, examples of the parameters for decoding the payload data that can be carried in the control data are any one or more of:
a. message length,
b. rate adaptation parameters (e.g. a puncturing pattern) for the rest of the codeword,
c. error detection bits (such as CRC) to allow early error detection and/or early hard decisions for iterative decoding in the manner described above.

Each of these (with the exception of the error detection bits) may be predetermined for the portion of the message carrying the control data. Data defining each predetermined parameter can be stored by the receiver for use as default encoding parameter(s) for decoding the control data.

Polar Codes

If decoded with a successive cancellation (SC) or SC-List decoder, polar decoders make an estimate of the transmitted sequence bit-by-bit. I.e., first a decision is made on the first bit, followed by the second bit, and so on (See E. Arikan, "Channel Polarization: A Method for Constructing Capacity-Achieving Codes for Symmetric Binary-Input Memoryless Channels," in IEEE Transactions on Information Theory, vol. 55, no. 7, pp. 3051-3073, July 2009). As a result, the first $k_c$ non-frozen bits of a codeword encoded using polar codes can be used to transmit control data, and that control data can be decoded even if the whole codeword is not yet capable of being decoded.

When polar coding is used, examples of the parameters for decoding the payload data that can be carried in the control data are any one or more of:
a. the set of frozen bits for the payload portion of the codeword,
b. error detection bits (such as CRC) for early error detection as described above, and early elimination of the wrong paths in the decoding list.

Each of these (with the exception of the error detection bits) may be predetermined for the portion of the message carrying the control data. Data defining each predetermined parameter can be stored by the receiver for use as default encoding parameter(s) for decoding the control data.

Figure 4:
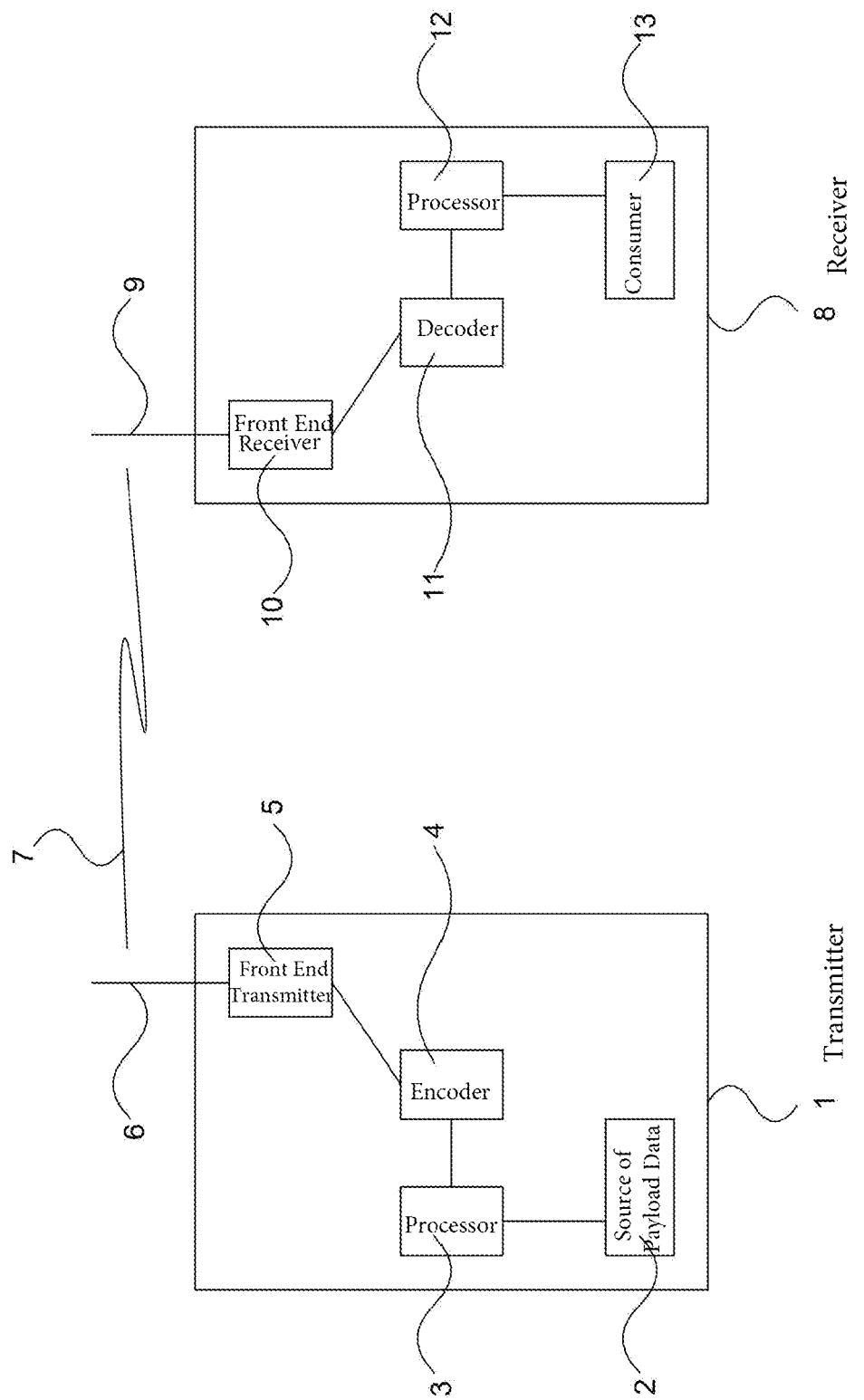
FIG. 4 is a schematic view of a transmitter/receiver architecture.
Figure 5:
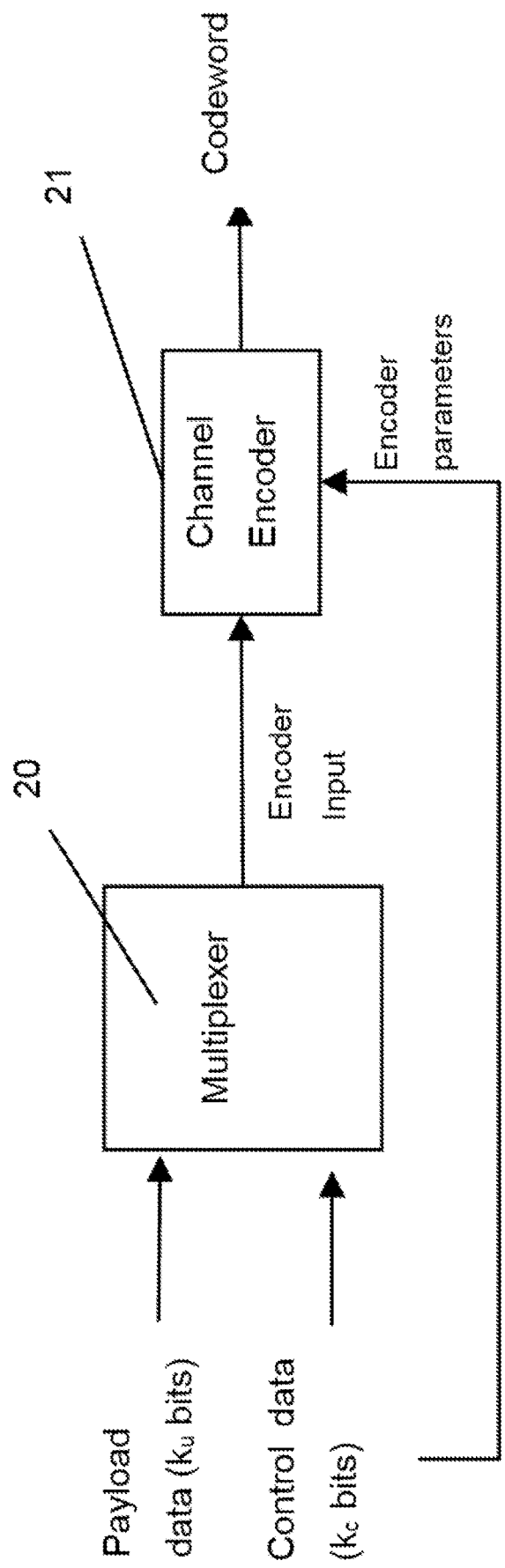
FIG. 5 shows a transmitter structure.
Figure 6:
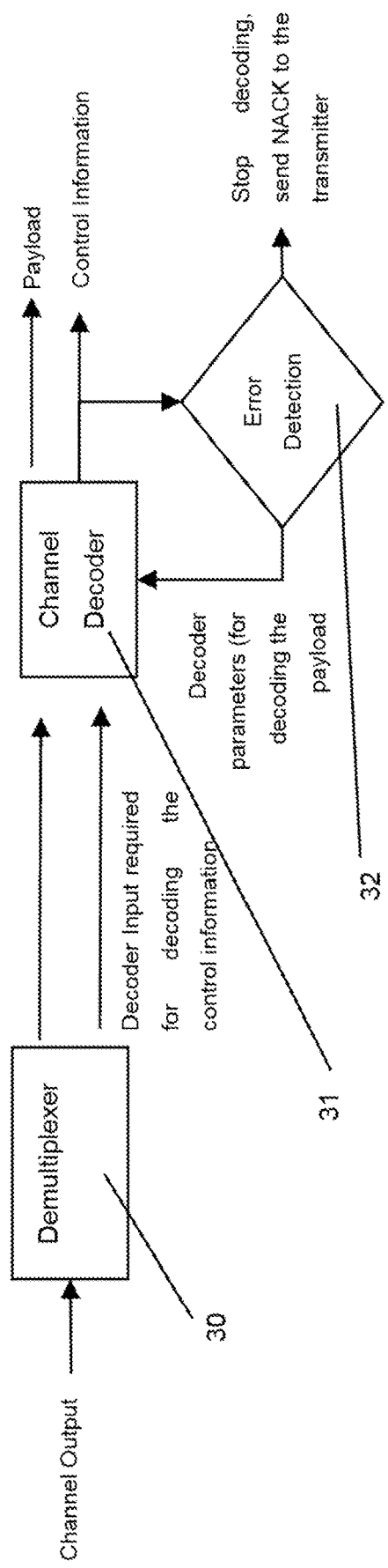
FIG. 6 shows a receiver structure.

FIGS. 4 to 6 illustrate a transmitter and a receiver for implementing the methods described above.

FIG. 4 is a schematic view of the transmitter/receiver architecture. The transmitter 1 comprises a source 2 of payload data. That may, for example be a user interface input device such as a keyboard or touchscreen. Data from the source 2 is passed to a processor 3 which packages it for transmission. Chunks of data for transmission as payload data are passed to an encoder 4. The encoder selects any non-default parameters for encoding of the payload data and forms control data representing those parameters. Then the encoder encodes the control data and the payload data to form a codeword. The control data is encoded according to a set of predefined default parameters. The payload data is encoded according to the parameters included in the control data. The codeword is passed to a transmitter front end 5, which transmits the codeword as a message. In this example the message is transmitted from an antenna 6 over a wireless channel 7. At receiver 8 the message is received at an antenna 9 which provides input to a receiver front end 10. Note that the idea is not limited to wireless channels but applicable to any communication system. Message data received by the receiver front end is passed to a decoder 11. The decoder 11 decodes the control data in a message using stored default decoding parameters. Conveniently the control data is contained in the leading part of the message. The decoder extracts other decoding parameters from the control data and uses them to decode the payload part of the message. Conveniently the payload part comes after the control data part. The recovered payload data is passed to a processor 12 which performs any necessary processing on the received data and then passes it to a consumer 13. The consumer may, for example, be a display or loudspeaker. Each device 1, 8 may be capable of acting as both a transmitter and a receiver.

FIG. 5 illustrates the encoder 4 in more detail. The encoder 4 first concatenates the bits of control data and the bits of payload data in block 20. They are then encoded together in block 21 using a selected high-level encoding scheme, but with potentially different parameters being used for encoding the two sets of data.

FIG. 6 illustrates the decoder 11 in more detail. Received data is divided into a portion representing the control data and a portion representing the payload data by demultiplexer 30. The portions are decoded by decoder 31 using stored parameters and/or parameters recovered from the control data. When the control data includes CRC data, error detection may be performed on the control data in block 32. If a CRC calculated by the receiver over the control data does not match the received CRC value then a NACK message can be sent to the transmitter.

As an example, a Wi-turbo code may be used as the high-level encoding scheme. The control data may be encoded using a default puncturing pattern, whereas the payload data may be encoded using a puncturing pattern selected by the transmitter. The control data may, for instance, have a length of 64 bits. The control data may include an indication of (a) the message length and (b) the puncturing pattern for the payload bits. When a message is received at the receiver, first the channel output corresponding to the 64 control bits is extracted. The obtained values are decoded using a suitable decoder (in this example that may be a sliding window decoder) which can decode the first 64 bits without requiring knowledge of the content of the control message. After the control message is decoded, error detection is performed on the decoded control bits. If those bits are decoded successfully, the decoder parameters are adjusted according to this information and the rest of the codeword is decoded, which contains the payload data. In this step, the decoder can also make use of the hard decisions of the decoded control bits to further improve the decoding performance of the rest of the codeword. If an error is detected, there is no need to decode the rest of the codeword and a NACK to the transmitter can already be sent. The same embodiment can also be employed with convolutional codes, convolutional LDPC codes and any other coding scheme allowing a sliding window decoder.

As another example, a Polar code may be used as channel code. A successive cancellation (SC) decoder (or an SC List decoder) for a Polar code takes a set of frozen bits as a decoder parameter. Due to the sequential structure of such a decoder, for decoding of the $j^{th}$ bit, only the frozen bits with indices less than j are required. Assuming the set of frozen bits with indices less than j is known to the receiver, the decoder can decode the non-frozen bits with indices less than j. Exploiting this property, a set of frozen indices larger than j can be defined in the control data. The control data, which may also include data for supporting an error detection mechanism, such as CRC, can be transmitted in the non-frozen bits with indices less than j. At the receiver, after the first j bits are processed, error detection is performed. If an error is detected, the decoding operation can be stopped and an early NACK can be sent to the transmitter. If no errors are detected, the set of frozen bits for the rest of the codeword is extracted from the control data and the decoding can continue according to those parameters. If a SC list decoder is used at the receiver, the error detection can also be used to remove incorrect partial-codewords from the list to further improve the decoding performance for the rest of the codeword.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

What is claimed is:

1. An apparatus for interpreting received data related to a message, the apparatus comprising:
   a demultiplexer configured to demultiplex the received data into a first portion and a second portion, wherein the first portion includes at least control data; and
   a decoder configured to:
      decode a first part of the message, based on the first portion of the received data, using a channel decoding scheme with a predefined decoding parameter to form a first data block,
      recover a decoding parameter for the second portion of the received data from the first data block, and
      decode a second part of the message, based on the second portion of the received data, using the channel decoding scheme with a decoding parameter that at least partially includes the decoding parameter recovered from the first data block.

2. The apparatus as claimed in claim 1, wherein the recovered decoding parameter is an indicator of a length of the second part of the message.

3. The apparatus as claimed in claim 1, wherein the recovered decoding parameter is a rate adaptation scheme for the second part of the message.

4. The apparatus as claimed in claim 1, wherein the recovered decoding parameter is a puncturing scheme for the second part of the message.

5. The apparatus as claimed in claim 1, wherein the recovered decoding parameter is a modulation order for the second part of the message.

6. The apparatus as claimed in claim 1, wherein the recovered decoding parameter is an error detection scheme for at least one of the first part of the message or the second part of the message.

7. The apparatus as claimed in claim 1, wherein the recovered decoding parameter is a set of frozen bits for the second part of the message.

8. The apparatus as claimed in claim 1, wherein the channel decoding scheme is such that the first part of the message can be decoded independently of the second part of the message.

9. The apparatus as claimed in claim 1, wherein the decoder is configured to decode the first part of the message using trellis decoding.

10. The apparatus as claimed in claim 1, wherein the decoder is configured to decode the first part of the message using sliding window decoding.

11. The apparatus as claimed in claim 1, wherein the de-multiplexer is configured to store the predefined decoding parameter.

12. The apparatus as claimed in claim 11, wherein the predefined decoding parameter includes one or more of: a length of the first part of the message, a rate adaptation scheme for the first part of the message, a puncturing scheme for the first part of the message, a modulation order for the first part of the message, an error detection scheme for the first part of the message, and a set of frozen bits for the first part of the message.

13. The apparatus as claimed in claim 1, wherein the first part of the message is a leading part of the message.

14. An encoder for encoding a data signal, the encoder comprising:
a channel encoder configured to store a predefined encoding parameter; and
a multiplexer configured to combine the data signal and a further encoding parameter into a message, wherein a first part of the message comprises the further encoding parameter,
wherein the channel encoder is further configured to map the message onto a codeword,
wherein a first portion of the codeword allows the first part of the message to be decoded independently of a second part of the message, and
wherein a second portion of the codeword allows the second part of the message to be decoded based on the further encoding parameter comprised in the first part of the message.

15. The encoder as claimed in claim 1, wherein the channel encoder is configured to encode the message using an encoding scheme such that knowledge of the further encoding parameter is required to permit the second part of the message to be decoded.

16. The encoder as claimed in claim 1, wherein the channel encoder is configured to select the further encoding parameter.

17. The encoder as claimed in claim 16, wherein the channel encoder is configured to select the further encoding parameter at the time of encoding the message.

18. The encoder as claimed in claim 14, wherein the further encoding parameter includes one or more of: a length of the second part of the message, a rate adaptation scheme for the second part of the message, a puncturing scheme for the second part of the message, a modulation order for the second part of the message, an error detection scheme for the second part of the message, and a set of frozen bits for the second part of the message.

19. A method for interpreting received data related to a message, applied to a signal receiver, the method comprising:
demultiplexing, by a demultiplexer, the received data into a first portion and a second portion, wherein the first portion includes at least control data;
decoding, by a decoder, a first part of the message, based on the first portion of the received data, using a channel decoding scheme with a predefined decoding parameter to form a first data block;
recovering, by the decoder, a decoding parameter for the second portion of the received data from the first data block; and
decoding, by the decoder, a second part of the message, based on the second portion of the received data, using the channel decoding scheme with a decoding parameter that at least partially includes the decoding parameter recovered from the first data block.

20. A method for encoding a data signal, the method comprising:
storing, by an encoder, a predefined encoding parameter;
combining, by the encoder, the data signal and a further encoding parameter into a message, wherein a first part of the message comprises the further encoding parameter; and
mapping, by the encoder, the message onto a codeword,
wherein a first portion of the codeword allows the first part of the message to be decoded independently of a second part of the message, and
wherein a second portion of the codeword allows the second part of the message to be decoded based on the further encoding parameter comprised in the first part of the message.

* * * * *